(12) United States Patent
Hsieh

(10) Patent No.: US 7,031,145 B2
(45) Date of Patent: Apr. 18, 2006

(54) POWER CONTROL APPARATUS FOR HINGE DEVICE

(75) Inventor: Meng Ju Hsieh, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 209 days.

(21) Appl. No.: 10/691,147

(22) Filed: Oct. 21, 2003

(65) Prior Publication Data
US 2004/0212955 A1    Oct. 28, 2004

(30) Foreign Application Priority Data
Apr. 23, 2003    (TW) ............................. 92206448 U

(51) Int. Cl.
*G06F 1/20*    (2006.01)
(52) U.S. Cl. ..................... 361/681; 361/683
(58) Field of Classification Search ........ 361/679–681, 361/683
See application file for complete search history.

(56) References Cited

U.S. PATENT DOCUMENTS 5,077,551 A * 12/1991 Saitou ........................ 345/207
5,592,362 A * 1/1997 Ohgami et al. ............. 361/686
6,011,544 A * 1/2000 Sato ............................ 345/168
6,191,938 B1    2/2001 Ohgami et al.

FOREIGN PATENT DOCUMENTS

CN    99123856.7    5/2000

* cited by examiner

*Primary Examiner*—Yean-Hsi Chang
(74) *Attorney, Agent, or Firm*—Wei Te Chung

(57) ABSTRACT

A power control apparatus for coupling a first unit to a second unit is provided. The power control apparatus includes a hinge device, a suspend switch, and an actuator. The hinge device includes a first portion secured to the first unit, and a second portion secured to the second unit and pivotally engaged with the first portion. The first portion includes a sleeve. The second portion includes a shaft. The shaft is pivotally received in the sleeve. The suspend switch is provided on the second portion and includes an elastic button. The actuator extends from the sleeve. The first portion can rotate relative to the second portion between a first position in which the button protrudes out from the switch, and a second position in which the button is depressed into the switch by the actuator so that the second unit terminates signals and power delivery to the first unit.

20 Claims, 5 Drawing Sheets

POWER CONTROL APPARATUS FOR HINGE DEVICE

1. FIELD OF THE INVENTION

The present invention relates to a power control apparatuses, and particularly to a power control apparatus which is used in a hinge device to save electronic resource.

2. RELATED ART

A portable electronic device such as notebook computer is easy to carry and can be freely used anywhere, even in places where no commercial power supply is available, by using a battery pack incorporated in the computer. However, the capacity of the battery is limited. In most situations, the display of the computer is powered on when the computer system itself is operating, and the display is powered off when the computer system is switched off. During waiting time or stand-by time, the display continues to consume the limited power of the battery. Not only does the battery have limited capacity, but it is also limited in size because of the need for the computer case to be compact and portable. This makes conservation of the battery an important yew problematic issue.

Certain devices have been developed to solve the above mentioned problem. For example, China Patent Application No. 99123856.7 discloses a power saving circuit and method applied in a liquid crystal display (LCD) device. In this patent, the power circuit automatically shuts off power to the LCD display after a predetermined idle time has elapsed. However, the power circuit is complicated and increases the cost of the LCD device. In addition, the control method does not accurately control the power consumed by the LCD display.

Recently, suspend switches have been used in notebook computers to control the powering on and off of the displays. Most of these suspend switches are equipped outside the computer. This tends to detrimentally obviously affect the aesthetic appearance of the computer, and exposes the suspend switch to contamination and accidental damage.

An improved suspend switch which solves the above-described problems is desired.

SUMMARY OF THE INVENTION

Accordingly, a main object of the present invention is to provide a power control apparatus for use with a hinge device of electronic equipment, in which the power control apparatus has a simple structure and efficiently and safely controls power consumption of the electronic equipment.

To achieve the above object, a power control apparatus includes a bearing scat secured in a mainframe of an electronic device, a rotating portion secured in a display of the electronic device, and a loading board attached to the bearing seat. The bearing seat includes a shall. The rotating portion includes a sleeve pivotally receiving the shaft of the bearing seat. The sleeve has an actuator extending therefrom. The sleeve defines a slit therein. A connecting board extends outwardly from the sleeve and the slit. The connecting board defines a pair of connecting holes therein. The loading board includes a suspend switch with an elastic button thereon. The rotating portion is rotatable between a first position in which the button protrudes from the switch and a second position in which the button is depressed into the switch by the actuator so that the mainframe terminates signals and power delivery to the display.

Other objects, advantages and novel features of the present invention will be drawn from the following detailed description of preferred embodiments of the present invention with the attached drawings, in which:

DESCRIPTION OF THE PREFERRED EMBODIMENT

Figure 1:
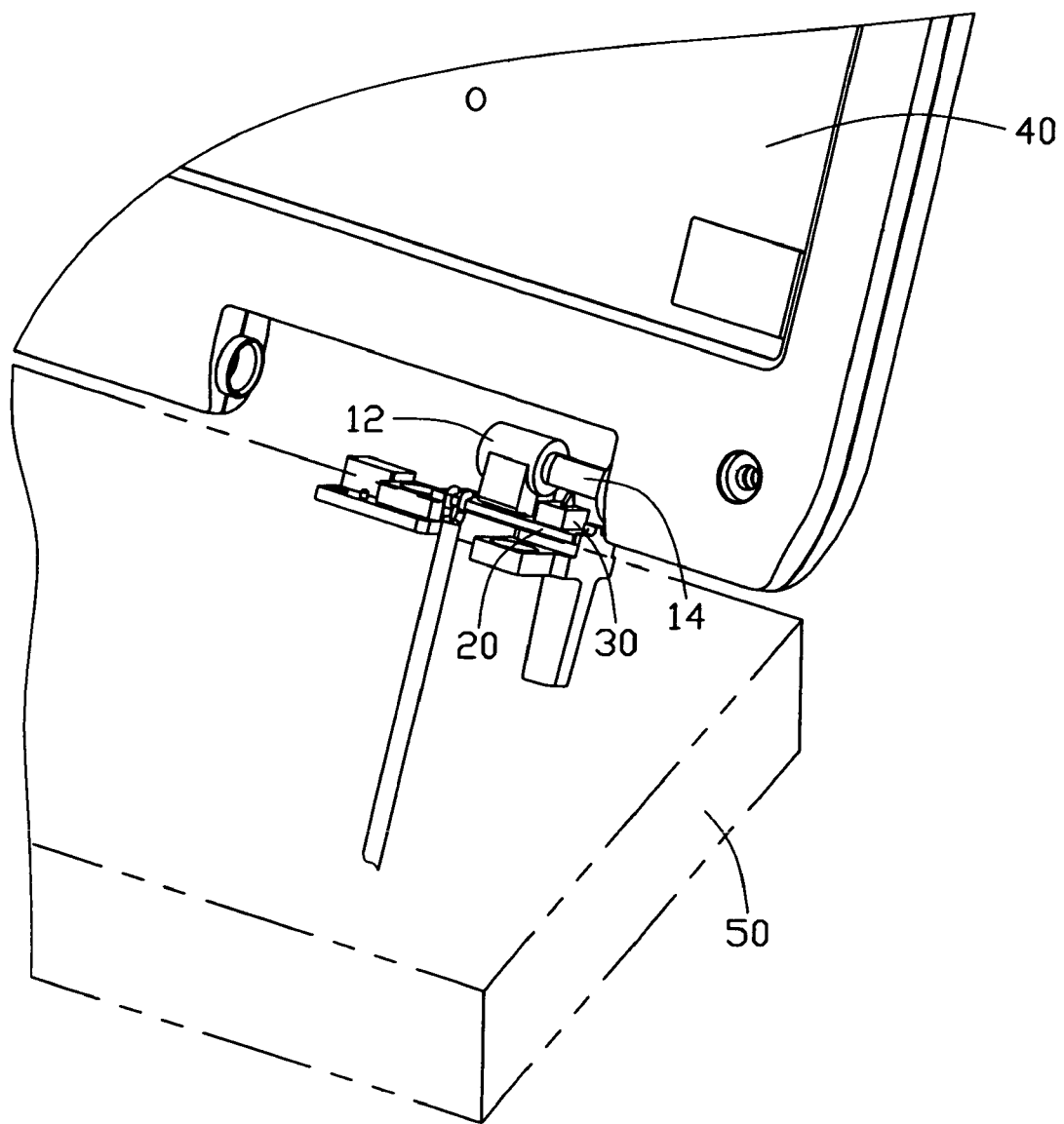
FIG. 1 is an isometric view of a power control apparatus in accordance with the present invention installed in a notebook computer, the power control apparatus comprising an actuator, a suspend switch and a button.
Figure 2:
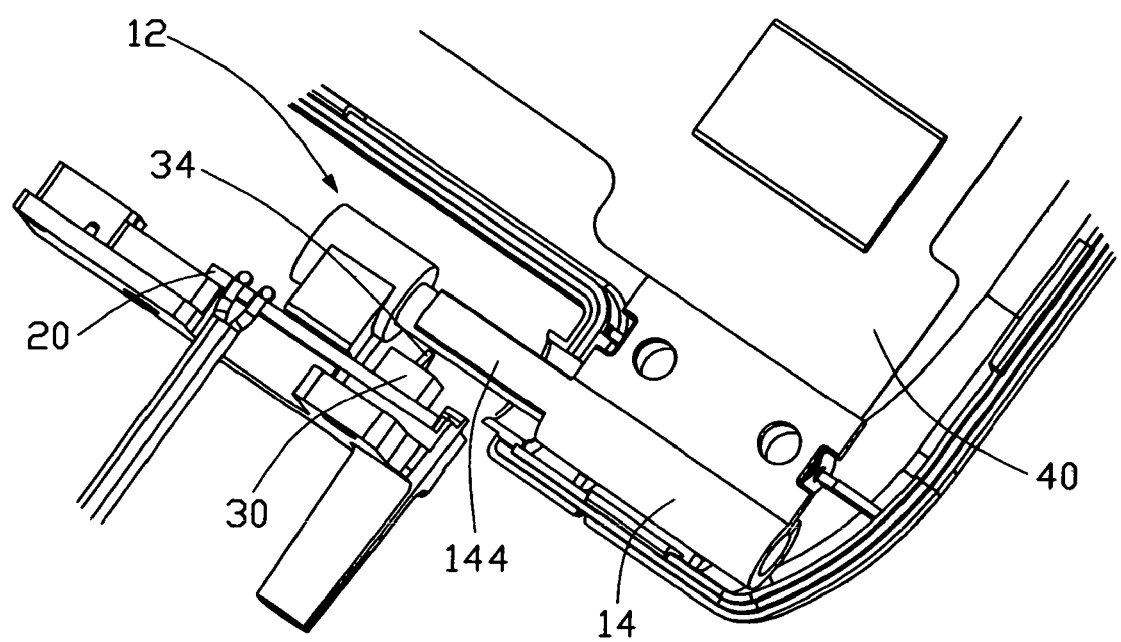
FIG. 2 is an enlarged view of part of the power control apparatus of FIG. 1, but viewed from a slightly different aspect.

Referring to FIGS. 1 to 6, a power control apparatus in accordance with the present invention is adapted to be used in a notebook computer. The power control apparatus can also be applied in any other electronic device which utilizes a hinge device therein. The power control apparatus comprises a hinge device 10, a loading board 20 and a suspend switch 30. The hinge device 10 is used to pivotally couple a display 40 to a mainframe 50 of the notebook computer. The display 40 may be a LCD display, or similar output display. The loading board 20 is fixed in the hinge device 10. The suspend switch 30 is attached to the loading board 20, and control power on/off of a power supply to the display 40. When the display 40 is rotated relatively to the mainframe 50, this triggers the suspend switch 30 at a predetermined position.

Figure 3:
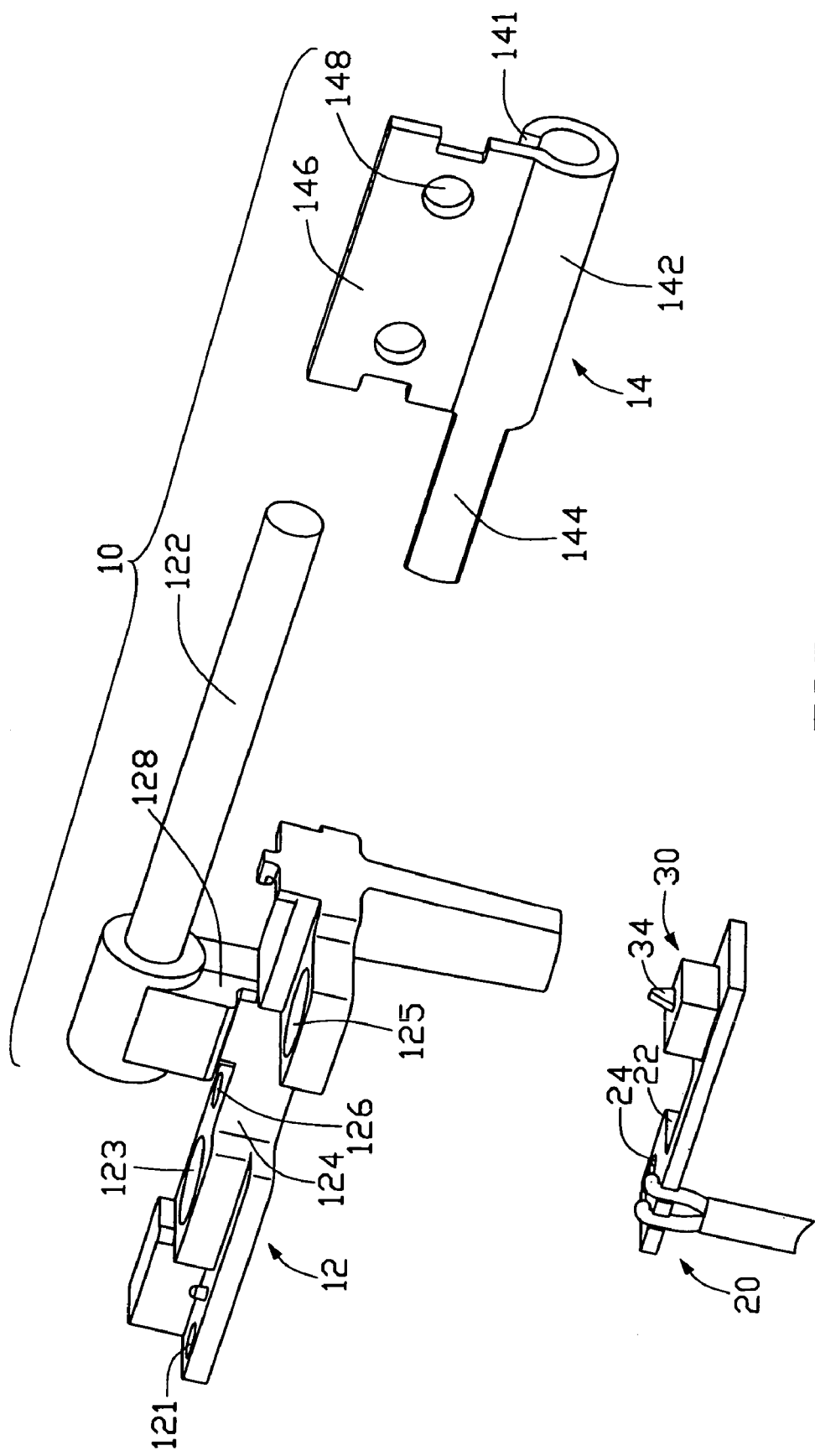
FIG. 3 is an explored, isometric view of the power control apparatus in accordance with the present invention.

Referring particularly to FIG. 3, the hinge device 10 comprises a bearing seat 12 and a rotating portion 14. The bearing seat 12 is fixedly attached to the mainframe 50 of the notebook computer. The bearing seat 12 comprises a base 124, a shaft 122, and a neck portion 128. The neck portion 128 extends upwardly from the base 124. The shaft 122 extends horizontally from an upper end of the neck portion 128. That is, the neck portion 128 interconnects the base 124 and the shaft 122. The base 124 defines securing holes 121, 123, 126 and 125 therein. The rotating portion 14 comprises a sleeve 142 for pivotally receiving the shaft 122 of bearing seat 12. The sleeve 142 defines a longitudinal slit 141 therein. An elongate actuator 144 extends coplanarly from an end of the sleeve 142. A longitudinal connecting board 146 extends upwardly from a periphery of the sleeve 142 adjacent the slit 141. The connecting board 146 defines a pair of connecting holes 148 therein.

The loading board 20 is attached to the bearing seat 12. The suspend switch 30 is fixed on the loading board 20. The suspend switch 30 comprises a movable elastic button 34. The button 34 is adapted to be depressed into the suspended switch 30, and to bound to an original position in which it protrudes out from the suspend switch 30. When the button 34 is depressed into the suspend switch 30, it breaks a control circuit in the notebook computer so that the power supply to the display 40 is cut off. The position of the button 34 determines whether the suspend switch 30 is in a power on or a power off position. In the off position, the button 34 is depressed into the suspend switch 30, and the notebook computer's operating system terminates signals and power delivery to the display 40. Conversely, in the on position, the button 34 protrudes out from the suspend switch 30, and the notebook computer operating system delivers signals and power to the display 40. The loading board 20 defines a cutout 22 and a securing hole 24 therein.

In assembly, the loading board 20 is attached to the bearing seat 12. An intermediate part of the neck portion 128 of the bearing seat 12 is engagingly received in the cutout 22 of the loading board 20. A fastener is extended through securing hole 24 of the loading board 20 to engage in the securing hole 126 of the seat 124 of the bearing seat 12. The rotating portion 14 is pivotally coupled to the bearing seat 12. The shaft 122 of the bearing seat 12 is inserted into the sleeve 142 of the rotating portion 14. The actuator 144 can rotationally contact the button 34 of the suspend switch 30. Fasteners (not shown) are extended through the connecting hole 148 of the connecting board 146 to secure the rotating portion 14 to the display 40. Fasteners are extended through the securing hole 121, 123, 125 of the base 124 of the bearing seat 12 to secure the bearing seat 12 to the mainframe 50.

Figure 5:
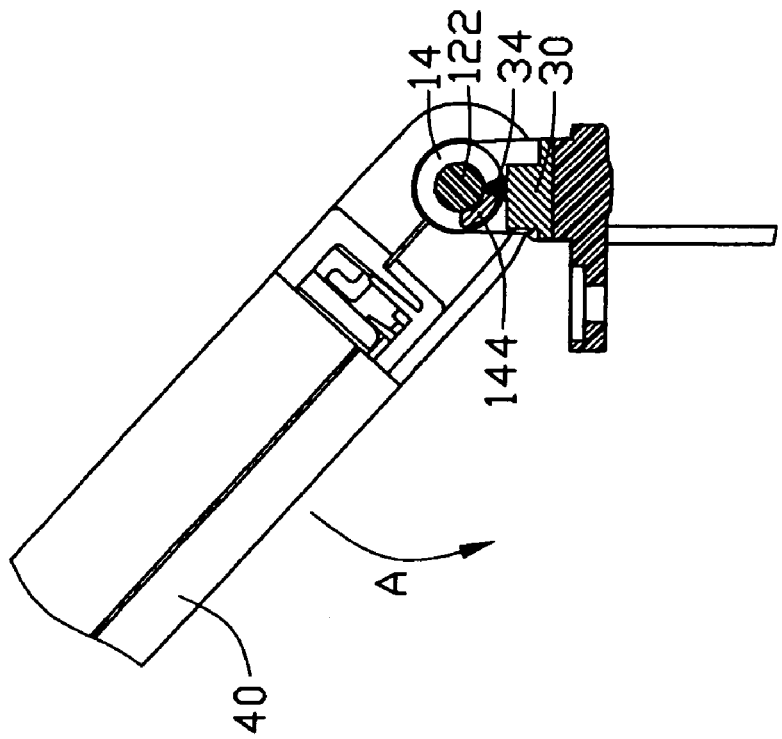
FIG. 5 is similar to FIG. 4, but showing the actuator beginning to contact the button.
Figure 4:
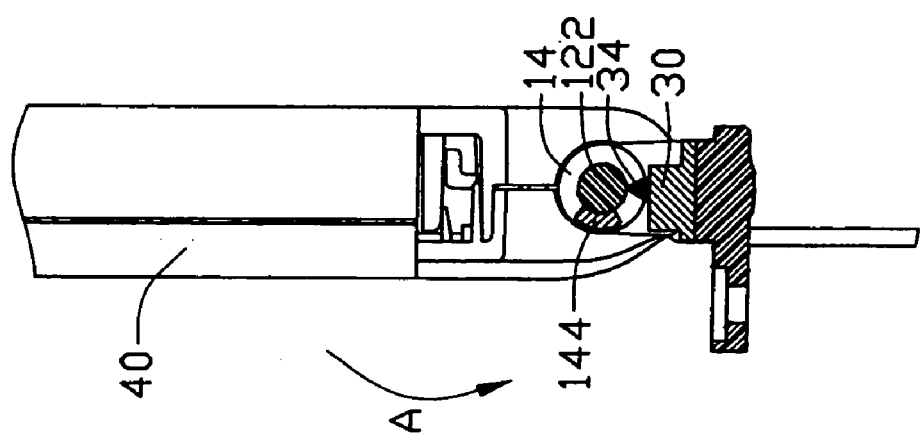
FIG. 4 is a schematic, side elevation cross sectional view of FIG. 1, showing the actuator a distance from the button of the suspended switch.
Figure 6:
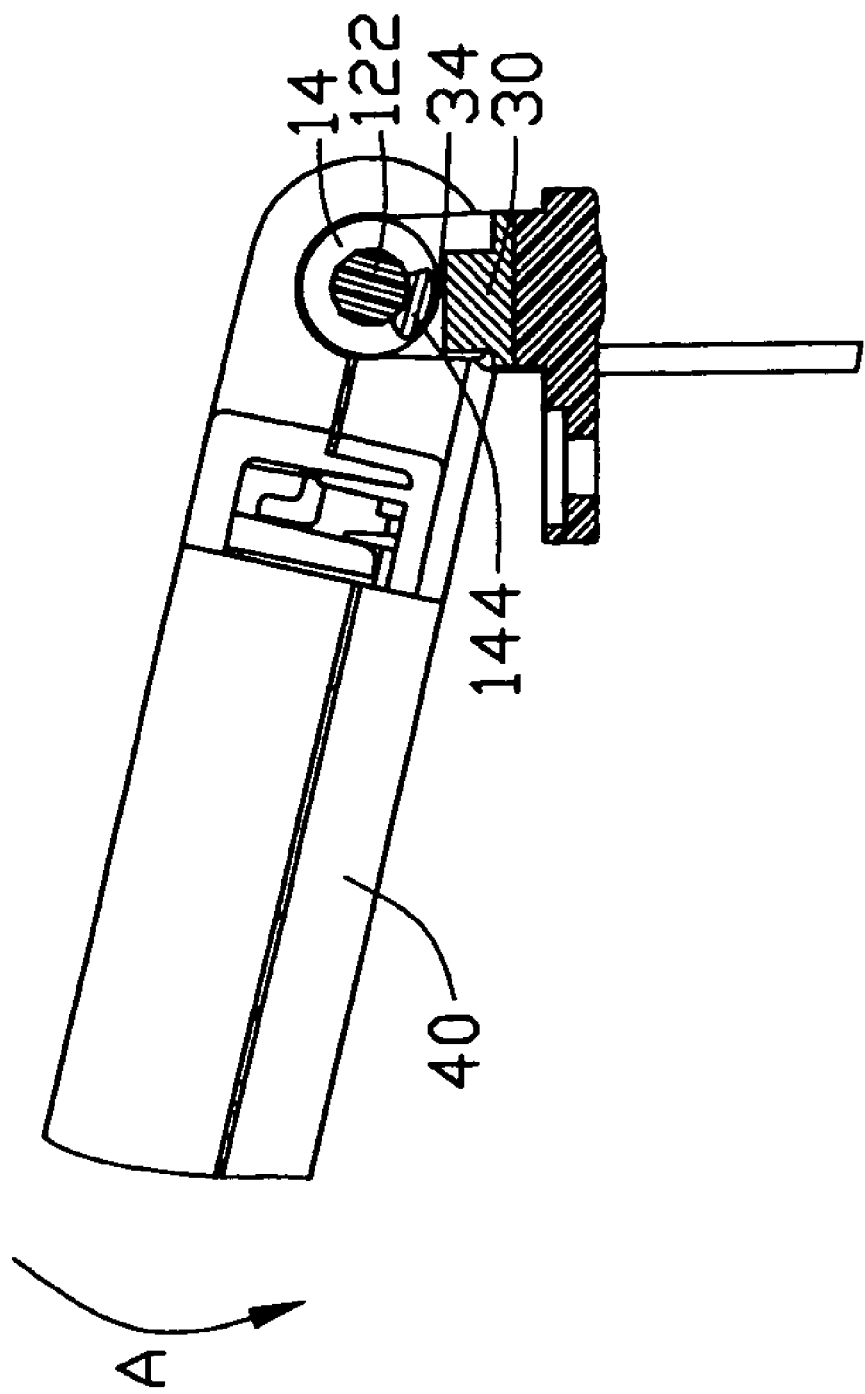
FIG. 6 is similar to FIG. 5, but showing the actuator completely depressing the button into the suspend switch.

Referring to FIGS. 4, 5 and 6, in operation, the display 40 can be rotated from an open position through intermediate positions to a close position along in a direction indicated by arrow A. In the open position, the actuator 144 is far away from the button 34, and the button 34 is in a released state protruding out from the suspend switch 30. When the display 40 is rotated in direction A, the actuator 144 comes into contact with and gradually depressed the button 34 into the suspend switch 30. When the button 34 is completely depressed into the suspend switch 30, the button 34 is in the off position, and the notebook computer operating system terminates signals and power delivery to the display 40.

When the display 40 is rotated back in a direction opposite to direction A, the actuator 144 rotates from and gradually releases the button 34. When the actuator 144 completely separates from the button 34, the button 34 returns to its original position protruding out from the suspend switch 30. The button 34 is in the on position, and the notebook computer operating system delivers signals and power to the display 40.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

The invention claimed is:

1. A power control apparatus adapted for being applied in an electronic device, the electronic device comprising a display and a mainframe, the power control apparatus comprising:
   a bearing seat adapted to be secured in the mainframe, the bearing seat comprising a shaft;
   a rotating portion adapted to be secured to be secured in the display, the rotating portion comprising a sleeve pivotally receiving the shaft, and an actuator extending from the sleeve, the sleeve defining a slit therein, a connecting board extending outwardly from the sleeve and the slit, the connecting board defining a pair of connecting holes therein; and
   a loading board attached to the bearing seat, the loading board comprising a suspend switch having an elastic button;
   wherein the rotating portion is rotatable between a first position in which the button protrudes from the switch and a second position in which the button is depressed into the switch by the actuator so that the mainframe terminates signals and power delivery to the display.

2. The power control apparatus as described in claim 1, wherein the bearing seat further comprise a base and a neck portion extending upwardly from the base, and the shaft extends from an upper end of the neck portion.

3. The power control apparatus as described in claim 2, wherein the base defines a plurality of securing holes therein.

4. The power control apparatus as described in claim 3, wherein the loading board further defines a securing hole therein corresponding to one of the securing holes of the base of the bearing seat.

5. The power control apparatus as described in claim 2, wherein the loading board defines a cutout therein, the cutout engagingly receiving the neck portion of the bearing seat.

6. The power control apparatus as described in claim 1, wherein the actuator extends generally coplanarly from the sleeve.

7. A power control apparatus for coupling a first unit to a second unit, the power control apparatus comprising:
   a hinge device comprising a first portion secured to the first unit and a second portion secured to the second unit and pivotally engaged with the first portion, the first portion including a sleeve, the second portion including a bearing seat and a loading board attached to the bearing seat, the bearing seat including a base, a neck portion, and a shaft, the neck portion extending upwardly from the base, the shaft extending from an end of the neck portion and being pivotally received in the sleeve;
   a suspend switch being attached to the loading board, the suspend switch having an elastic button provided on the second portion; and
   an actuator provided on the first portion and extending from the sleeve;
   wherein the first portion can rotate relative to the second portion between a first position in which the button protrudes out from the switch, and a second position in which the button is depressed into the switch by the actuator so that the second unit terminates signals and power delivery to the first unit.

8. The power control apparatus as described in claim 7, wherein the button is movably installed in the suspend switch.

9. The power control apparatus as described in claim 7, wherein the loading board defines a cutout therein, the cutout engagingly receiving the neck portion of the bearing seat.

10. The power control apparatus as described in claim 7, wherein the base defines a securing hole, and the loading board further defines a securing hole therein corresponding to the securing hole of the base of the bearing seat.

11. The power control apparatus as described in claim 7, wherein the actuator extends generally coplanarly from an end of the sleeve.

12. power control apparatus as described in claim 11, wherein the second portion further comprises a connecting board, the sleeve defines a slit therein, the connecting board extends from the sleeve adjacent the slit, and the connecting board defined a pair of connecting holes, for securing the second portion to the first portion.

13. A power control apparatus assembly comprising:
a first unit providing power,
a second unit receiving the power to show images;
a hinged device including a sleeve section secured to one of the first unit and the second unit, and a shaft section secured to the other of the first unit and the second unit under a condition that said sleeve section coaxially rotatably surrounds said shaft section;
an actuation switch mounted to said other of the first unit and the second unit, at least part of the actuation switch being configured for being laterally/radially moveable relative to said other of the first unit and the second unit and said shaft section;
an actuator coaxially extending from a distal end of said sleeve section with a distance wherein said actuator is not of a full circumference but in a limited angle range corresponding to said actuation switch; wherein
by means of rotation of the sleeve section about the shaft section, the actuation switch can be activated or deactivated by said actuator so as to decide whether the second unit receives the power or not.

14. The assembly as described in claim 13, wherein said actuator is essentially a periphery region of a sector.

15. The assembly as described in claim 13, wherein said shaft includes a neck portion connected to said other of the first unit and the second unit, and the actuator is located axially between said neck portion and the sleeve section.

16. A power control apparatus for coupling a first unit to a second unit, the power control apparatus comprising:
a first unit providing power;
a second unit receiving power to show images;
a hinge device comprising:
a first part secured to the first unit, the first part including a base, a connecting portion extending upwardly from the base, a shaft extending away from an end of the connecting portion, and a button being moveably installed in the base; and
a second part secured to the second unit and pivotally engaged with the first part, the second part including a rotating portion configured for pivotally receiving the shaft and an extending portion extending laterally away from an end of the rotating portion and partially surrounding the shaft, the extending portion having an actuator segment corresponding to the button, the actuator segment having an open-end radial cross section;
wherein the first part can rotate relative to the second part between a first position in which the actuator segment is away from the button and the button is deactivated, and a second position in which the actuator segment touches and acts on the button so that the button is activated and the second unit terminates signals and power delivery from the first unit.

17. The power control apparatus as described in claim 16, wherein the extending portion is located axially between the Connecting portion and the rotating portion.

18. The power control apparatus as described in claim 16, wherein the actuator segment is located radially between the shaft and the button when the first unit rotates to the first position, and the shaft is located radially between the actuator segment and the button when the first unit rotates to the second position.

19. The power control apparatus as described in claim 16, wherein the button is configured for radially/laterally moving relative to the shaft.

20. The power control apparatus as described in claim 16, wherein extending portion extends generally coplanarly from the rotating portion.

* * * * *